…

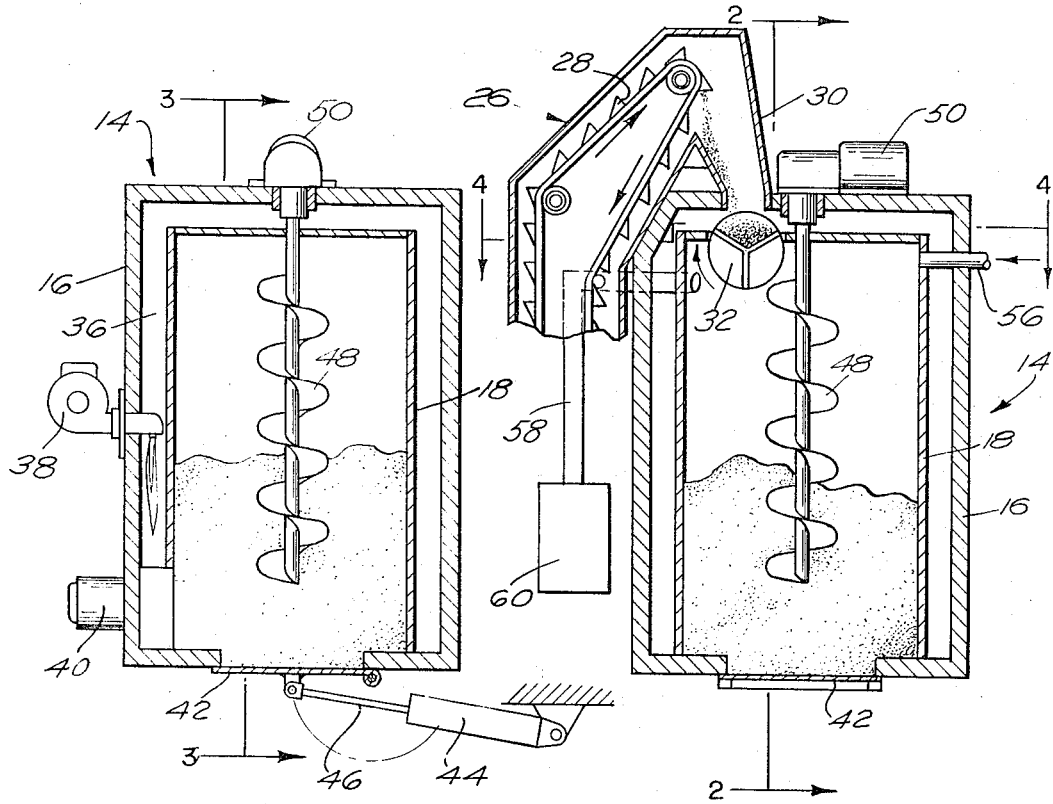
FIG. 2
FIG. 3
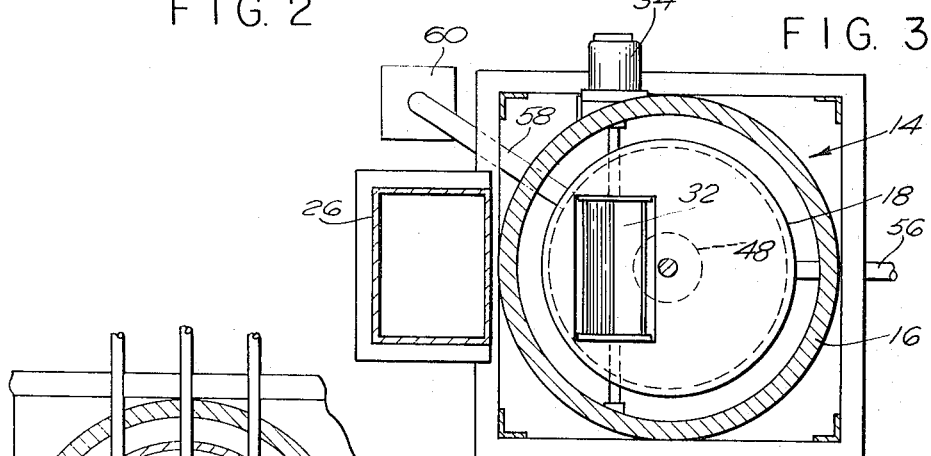
FIG. 4
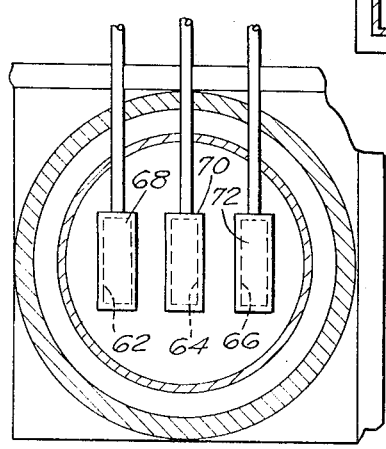
FIG. 5
INVENTOR.
CHARLES C. PLUMB
BY Salter & Michaelson
ATTORNEYS

United States Patent Office 3,305,138
Patented Feb. 21, 1967

3,305,138
APPARATUS FOR STORING AND DISTRIBUTING HEATED ASPHALT MIX
Charles C. Plumb, 114 Ocean Ave., Cranston, R.I. 02910
Filed July 20, 1964, Ser. No. 383,838
4 Claims. (Cl. 222—146)

The present invention relates to an apparatus for temporarily storing and distributing a hot bituminous mix. More particularly, the present invention relates to the apparatus by which a hot bituminous mix is transferred from an external source to a heated container and maintained in a relatively fluid state within the heated container for the dispensing therefrom as desired.

Liquid asphalt and an aggregate such as sand, slag, crushed gravel, and stone constitute a hot bituminous mix that is employed as a surface coating for roadways and the like. In the use of such a hot bituminous mix, it has been the practice to dispense the mix from a mixing unit into trucks that transport the mix to the location or site where it is applied to a roadway or other surface as required. The equipment for preparing the hot bituminous mix is of such a size and structure that fairly large quantities of the mix must be prepared during a working period. Since the mix cannot be stored or maintained by the mixing unit, all of the mix must be dispensed from the unit and used within a relatively short period of time. On many occasions only a small amount of the mix material is need for a particular job, and on other occasions an emergency situation sometimes occurs that requires immediate need of the mix. In such circumstances, unless the mixing unit has already prepared the mix for dispensing, a period of waiting is necessary before the mix is made available for use. If only a small quantity of the mix is required, then such quantity may not be available until the mixing unit is put into operation for mixing the usual large batch.

The present invention is designed to avoid the attendant difficulties experienced heretofore in obtaining a hot bituminous mix in small quantities or at any time the need for the mix occurs. This is accomplished by providing a storage silo in which a quantity of the prepared mix is introduced and maintained in a condition for immediate dispensing and use as required. In order to maintain the hot bituminous mix in a relatively fluid state for dispensing, the silo or container in which the mix is stored is heated to a sufficient temperature to maintain the mix in condition for pouring. Since the hot mix cannot be heated directly, a unique system is employed whereby an outer housing is provided in which the inner silo is located, the inner silo being spaced from the outer housing. The space defined by the inner silo and outer housing forms an annular passageway in which a heated gas is continuously circulated. Since the inner silo or housing is formed of a corrugated metal material, the metal will promote the transfer of heat, and thus the hot mix material that is introduced into the inner silo will be maintained at the proper temperature level to provide for the pouring thereof.

The storage container for the hot bituminous mix further includes means for maintaining the mix within the container in proper condition for the dispensing thereof whenever it is required. One such additional feature is the use of a mixing auger that may be periodically activated to stir the material within the container to prevent hardening thereof if such a hardening process occurs. It is also contemplated in the present invention to remove oxygen and impurities from within the inner silo by the use of a purge gas. By removing the oxygen and impurities, a high penetration of the mix material is maintained, which insures better working characteristics of the material when it is applied to a roadway surface or the like. It is further contemplated to dispense the material from the inner silo through a lower dispensing door that is hydraulically operated. In this connection more than one dispensing door may be provided at the dispensing end of the storage container so as to prevent the mix or aggregate from hardening in the corners of the storage container. If required a trough of predetermined volume may be employed for periodically introducing a measured quantity of the material into the inner silo of the storage container. The trough as contemplated for use will thus prevent constant pouring of the mix within the inner container and thereby will prevent separation of the mix components and will further prevent bridging of the material if such bridging tends to occur.

Accordingly it is an object of the invention to provide apparatus for receiving and temporarily storing a hot bituminous mix therein.

Still another object is to provide apparatus for temporarily storing a hot mix which includes an outer housing and an inner silo that is heated to maintain the mix therein in a condition for pouring.

Still another object is to provide apparatus for receiving and temporarily storing a hot bituminous mix which includes means for circulating a gaseous medium around an inner silo or housing that receives the mix therein, the heated gaseous medium maintaining the temperature within the silo at a sufficient level to promote the pouring of the mix therefrom.

Still another object is to provide a container for temporarily storing a hot bituminous mix in which a mixing element extends for mixing the mix therein and thereby preventing hardening or bridging thereof.

Still another object is to provide a container for temporarily storing a hot bituminous mix and into which a purge gas is introduced, the purge gas acting to withdraw oxygen and impurities from the container and thereby promoting better working characteristics for the mix in the use thereof.

Other objects, features, and advantages of the invention will become apparent as the description thereof proceeds when considered in connection with the accompanying illustrative drawings.

In the drawings which illustrate the best mode presently contemplated for carrying out the instant invention:

FIG. 2 is a sectional view of the container for storing the hot mix therein.

FIG. 3 is a sectional view taken along lines 3—3 in FIG. 2.

FIG. 4 is a sectional view taken along lines 4—4 in FIG. 3; and

FIG. 5 is a bottom plan view of a modified form of the storage container embodied herein.

Figure 1:
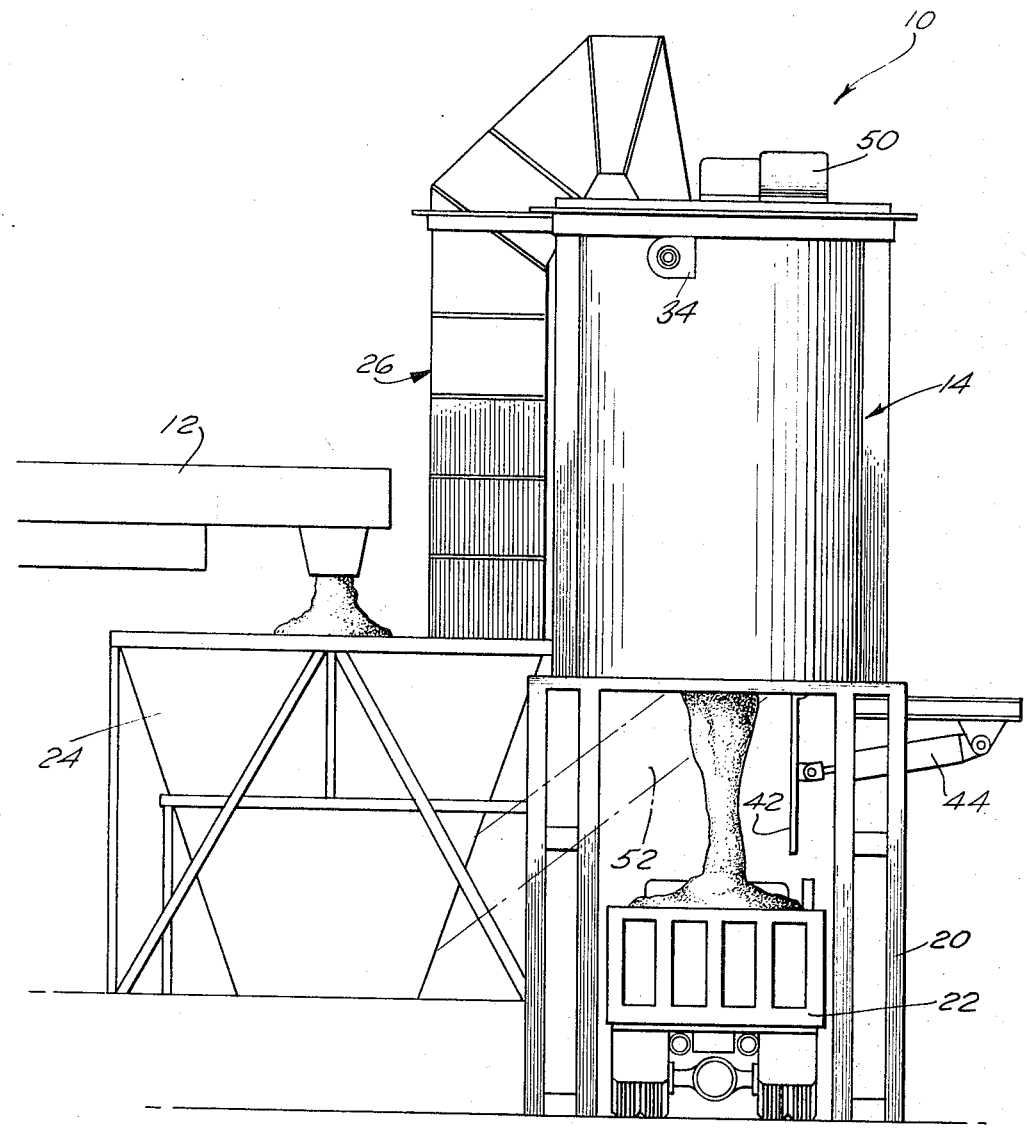
FIG. 1 is an elevational view of the apparatus that is embodied in the present invention for receiving and temporarily storing a hot bituminous mix therein.

Referring now to the drawings and particularly to FIG. 1, the apparatus for receiving and temporarily storing a hot bituminous mix is illustrated and is generally indicated at 10. It is understood that the apparatus 10 is designed to store a hot bituminous mix that is to be utilized for the surfacing of roadways or the like. The mix material is adapted to be formulated in the well-known manner from liquid asphalt and an aggregate and at an external source. Any suitable means may be employed for conveying the mix material to the apparatus 10, and in FIG. 1, a conveyor 12 is illustrated as being representative of any conventional construction that may be utilized for conveying the hot mix to the apparatus 10.

The primary purpose of the apparatus embodied in the present invention is to temporarily store a hot bituminous mix for dispensing as required. For this purpose a storage container generally indicated at 14 is provided and as shown in FIGS. 2, 3, and 4, the storage container 14 includes an outer housing 16 and an inner silo or housing 18 that is formed of a metal material. In order to dispense the material from the storage container 14, the container is located in elevated position on a frame indicated at 20, the members that define the frame 20 being spaced apart to permit a truck 22 to enter therebetween for location beneath a discharge opening in the storage container 14 when the mix material located therein is to be dispensed.

Because of the nature of the hot bituminous mix and the ingredients thereof, the mix cannot be indiscriminately dumped into the inner housing or silo 18. Such dumping would result in separation of the components of the mix which would prevent the mix from being utilized as required. Thus the hot mix must be introduced into the inner housing 18 in such a manner as to prevent the separation of the components thereof. As shown in FIG. 1 a supply hopper 24 is located adjacent to the container 14 and receives the hot bituminous mix from the conveyer 12. Communicating with the hopper 24 is a boot elevator 26, which as shown in FIG. 3 includes a plurality of buckets 28 that are adapted to convey the hot mix from the hopper 24 to the upper end of the container 14. The boot elevator 26 is of conventional construction and is operated in any well known manner.

The outer housing 16 is formed with an inlet opening at the uppermost end thereof in which an inlet chute 30 formed as part of the boot elevator 26 is located. The chute 30 directs the mix from the boot elevator 26 through the opening in the outer housing 16 and through an opening formed in the inner silo or housing 18. It is contemplated that the mix will be dropped by the buckets 28 directly through the upper opening in the inner silo or housing 18 and will be directed therein by a baffle construction (not shown), the baffle construction moving the mix toward the sidewall of the inner housing as it falls therein. An additional directing inlet member may also be employed and as shown in FIG. 3 includes a trough 32 that is adapted to introduce a limited quantity of the mix into the inner silo or housing 18 at intervals. Thus as the mix is directed into a compartment of the trough 32, the trough 32 will be rotated to cause the mix received in the topmost compartment to drop within the inner housing 18. This metered introducing of the mix into the inner housing 18 will tend to prevent separation of the components of the mix. Since the mix is introduced into the housing 18 in limited quantities by the buckets 28 of the boot elevator 26 it is seen that the heretofore mentioned baffle would cooperate with the boot elevator to prevent dumping of the mix. If the trough 32 is employed, it may be controlled by a motor 34 that is operated in a prescribed manner to meter the flow of the mix into the inner housing or silo 18.

In order to prevent the mix within the inner housing 18 from bridging or hardening and to further promote the pouring thereof when required, the inner housing 18 is heated so as to maintain the mix therein in a heated and fluid condition. For this purpose, the inner container 18 is spaced from the outer container 16 to define an annular passageway 36. Referring to FIG. 2, a burner 38 is shown being mounted on the outer housing 16 and is adapted to supply a hot gas within the passageway 36. In order to circulate the hot gas introduced into the passageway 36 by the burner 38 a fan 40 is provided. The fan 40 which is also fixed to the outer housing 16 circulates the heated gas continuously within the passageway 36. The continuous circulation of the heated gas through the passageway 36 and into contact with the metal walls of the inner housing 18 sufficiently heats the inner housing 18 to keep the temperature thereof at a sufficient level, so that the mix contained therein is maintained in a relatively liquid state for pouring.

In order to dispense the mix from the container 14 a discharge door 42 is provided and is located at the lowermost end thereof. The door or gate 42 is operated by a hydraulically controlled cylinder 44 from which a piston rod 46 extends. The piston rod 46 is secured to the door 42 and it is seen that the door 42 may be remotely controlled to open for a predetermined period of time, wherein a preselected quantity of the mix may be dispensed from the inner housing 18 into a truck as required.

On certain occasions, and depending upon the nature of the mix contained within the container 14, and upon the temperature maintained in the housing 18, it may be desirable to agitate the mix, particularly after a relatively long period of storage. For this purpose, a mixing element or auger 48 is provided, and extends vertically within the inner housing 18. The mixing element 48 is supported from the top wall of the outer housing 16, and is operatively interconnected to a motor 50 that is controlled for rotating the mixing element 48 in accordance with the requirements of the use thereof.

After long periods of storage of the mix within the container 14, it may be desirable to recirculate the mix, so as to prevent the hardening or bridging thereof. For this purpose an auxiliary chute 52 indicated in dotted lines in FIG. 1 is provided and is joined to the container 14 for communication with the discharge opening therein. The lower end of the chute 52 communicates with the hopper 24 and may direct the mix from the container 14 to the hopper 24. The mix may then be recycled from the hopper 24 by the boot elevator 26 into the container 14 as previously described. In connection with the deposit of the material by the boot elevator into the inner silo or housing 18, it is understood that the metering of the material by the boot elevator 28 and/or the trough 32 prevents separation of the mix as introduced into the silo or housing 18. Thus the stone is prevented from separation from the sand, and the mix is maintained in an integrated state within the inner housing 18.

Since the mix is adapted to be maintained within the container 18 for relatively long periods of time, it may also be desirable to purge the container of impurities and/or oxygen, thereby increasing the penetration effect of the mix when in use. For this purpose an inlet pipe 56 is provided and extends through the outer housing 18 into the inner housing 16 for introducing a purge gas such as ammonia under pressure therein. An exhaust pipe 58 is also connected to the inner housing 18 and directs the exhausted purge gas and impurities and oxygen entrapped thereby into a water tank 60. The water in tank 60 may be utilized to indicate the removal of the air and impurities from the inner housing 18 since bubbling will occur when the purge gas is exhausted therein. By removing the oxygen from the inner container 18 the mix contained therein will tend to be less brittle and and will thus have better penetration characteristics that will improve the performance thereof when in use.

It is understood that the mix may have a tendency to accumulate in the corners of the inner housing or silo 18. In order to prevent accumulation at these points, the inner housing 18 may be provided with a plurality of discharge openings indicated at 62, 64 and 66 in FIG. 5. Gates 68, 70 and 72 control the flow of material through the discharge openings 62, 64 and 66 respectively and may be moved linearly by any convenient operating means such as a rack and pinion. The use of the plurality of gates as indicated in FIG. 5 would prevent the mix material from solidifying at the corners of the silo 18 and would also distribute the discharge of the mix so as to prevent any material from remaining in the silo or inner housing for an undue period of time.

It is seen that the apparatus disclosed herein illustrates a unique process for temporarily storing a hot bituminous mix in a storage container by properly controlling the temperature of the container, the hot bituminous mix being maintained in a relatively fluid state therein for pouring. The temperature of the mix is maintained at the proper level by circulating a heated gas around the container in which the mix is located. The fan 40 continuously circulates the heated gas through the annular passageway 36, and thereby maintains the hot bituminous mix within the inner housing 18 at the proper pouring temperature. If it is required to dispense any or part of the mix within the storage container, the door 42 may be operated to open for a preselected period of time thereby dispensing the required quantity of the mix.

As set forth hereinabove, the material contained in the silo or housing 18 is described as being maintained in a fluid condition for pouring. It is understood that this description of the condition of the material is intended to convey the meaning that the material may be poured as an asphalt mix from the storage container. The asphalt mix as poured is thus in condition for use in road maintenance and/or road paving or the like.

By pouring the storage container as illustrated herein, the heated asphalt or bituminous mix would be made available at any period of time including the winter months when hot material is normally not available. It is comtemplated to place the storage containers at strategic locations and have portable mixing plants service the storage containers at periodic intervals. The various techniques described herein would insure that the heated mix would be maintained in proper condition within the storage containers for use and dispensing at all times.

While there is shown and described herein certain structure embodying the invention, it will be manifest to those skilled in the art that various modifications and rearrangements of the parts may be made without departing from the spirit and scope of the underlying inventive concept, and that the same is not limited to the particular forms herein shown and described, except, insofar as indicated by the scope of the appended claims.

What is claimed is:

1. In apparatus for receiving and temporarily storing a hot mix material that must be dispensed in a relatively fluid state, a storage container including an outer housing and an inner housing located within said outer housing and spaced therefrom to define an annular passageway therewith, means for introducing the hot mix into said inner housing, means for circulating a heated gaseous medium in said annular passageway, wherein the temperature within said inner housing is maintained at a sufficient level to maintain said hot mix in a condition for pouring while in said inner container, means for periodically releasing a predetermined quantity of said hot mix from the discharge end of said container as required, said introducing means including a hopper located exteriorly of said container for receiving said hot mix from an external source, an elevator communicating with said hopper for continuously transferring said hot mix from said hopper to said container, said outer and inner housings having inlet openings located at the upper ends thereof for receiving the hot mix from said elevator, said hot mix falling by gravity into said inner housing for accumulation therein, means for introducing a purge gas into said inner housing for purging impurities and oxygen therefrom, and means for withdrawing the impurities and oxygen from said inner housing, wherein the hot mix is prevented from crystallizing within the inner housing during the period of storage thereof.

2. In apparatus for receiving and temporarily storing a hot mix material that must be dispensed in a relatively fluid state, a storage container including an outer housing and an inner housing located within said outer housing and spaced therefrom to define an annular passageway therewith, means for introducing the hot mix into said inner housing, means for circulating a heated gaseous medium in said annular passageway, wherein the temperature within said inner housing is maintained at a sufficient level to maintain said hot mix in a condition for pouring while in said inner container, means for periodically releasing a predetermined quantity of said hot mix from the discharge end of said container as required, said introducing means including a hopper located exteriorly of said container for receiving said hot mix from an external source, an elevator communicating with said hopper for continuously transferring said hot mix from said hopper to said container, said outer and inner housings having inlet openings located at the upper ends thereof for receiving the hot mix from said elevator, said hot mix falling by gravity into said inner housing for accumulation therein, and a recirculation discharge chute communicating with said inner housing at the discharge end thereof, and with said hopper, said discharge chute directing the hot mix from said container into said hopper for recirculation back to said inner housing during storage periods of the hot mix, wherein said hot mix is maintained in a fluid state and is prevented from hardening in said inner housing.

3. In apparatus for receiving and temporarily storing a hot bituminous mix that is adapted to be dispensed in a relatively fluid state, a storage container in which the hot mix is temporarily stored, means for heating said hot mix material within said container for constantly maintaining said mix in the fluid state thereof, means for introducing the hot mix into said container, means for releasing a predetermined quantity of said hot mix from said container as required, said container including an outer housing and an inner housing located within said outer housing and spaced therefrom to define an annular passageway, said inner container receiving the hot mix therein and means for introducing and circulating a heated gaseous medium within said passageway, thereby maintaining the temperature within said inner housing at a sufficient level to retain the hot mix in said inner housing in a relatively fluid state, said introducing and circulating means including a burner that communicates with said passageway for supplying the heated gaseous medium thereto, a fan for continuously circulating said gaseous medium through said passageway, means for introducing a purge gas into said inner housing for purging oxygen and impurities therefrom, and means for exhausting the purge gas and entrapped gases from said inner housing, the removal of the entrapped gases from said inner housing maintaining proper penetration of said hot mix.

4. In apparatus for receiving and temporarily storing a hot mix material for use as a paving surface and that must be dispensed in a relatively fluid state, a storage container including an outer housing and an inner housing within said outer housing and spaced therefrom to define an annular passageway therewith, means for introducing the hot mix into said inner housing, means for circulating a heated gaseous medium in said annular passageway for maintaining the temperature in said inner housing at a level sufficient to retain said hot mix in said inner housing in a fluid state for pouring, means located exteriorly of said container for receiving said hot mix from an external source, and means communicating with said receiving means for transferring said hot mix therefrom to the inner housing of said container.

References Cited by the Examiner

UNITED STATES PATENTS

| | | | |
|---|---|---|---|
| 393,616 | 11/1888 | Case | 259—158 |
| 2,351,853 | 6/1944 | Graham | 99—271 |
| 2,867,421 | 1/1959 | Camm | 259—158 |
| 3,182,859 | 5/1965 | Harris et al. | 222—146 |

WALTER A. SCHEEL, *Primary Examiner.*

R. W. JENKINS, *Assistant Examiner.*